United States Patent [19]

Siliberschlag

[11] 4,226,309
[45] Oct. 7, 1980

[54] SPEED RESPONSIVE ROTARY COUPLING

[75] Inventor: Russel E. Siliberschlag, Glen Ellyn, Ill.

[73] Assignee: Borg-Warner Corporation, Chicago, Ill.

[21] Appl. No.: 900,385

[22] Filed: Apr. 26, 1978

[51] Int. Cl.² ............................................. F16D 43/14
[52] U.S. Cl. ............................ 192/3.31; 192/105 CE
[58] Field of Search .......... 192/3.31, 103 B, 105 BA, 192/105 CE

[56] References Cited

U.S. PATENT DOCUMENTS

| 1,910,141 | 5/1933 | Wemp | 192/105 BA |
| 2,400,585 | 5/1946 | Wolff | 64/30 LB |
| 2,534,133 | 12/1950 | Kirkpatrick | 192/105 BA |
| 3,258,095 | 6/1966 | Shelton | 192/103 B |
| 3,958,680 | 5/1976 | Armbruster | 192/105 BA |
| 4,140,210 | 2/1979 | Schulz | 192/3.31 |

FOREIGN PATENT DOCUMENTS 523906  4/1956  Canada ................................ 192/3.31

Primary Examiner—George H. Krizmanich
Attorney, Agent, or Firm—James A. Geppert

[57] ABSTRACT

A speed responsive coupling especially adapted for use as a lock-up clutch with a torque converter includes a centrifugal follower, load limit spring and stop in combination with a centrifugally engageable friction shoe, providing for low speed lock-up while limiting the torque capacity of the lock-up clutch at higher speeds.

9 Claims, 5 Drawing Figures

SPEED RESPONSIVE ROTARY COUPLING

BACKGROUND OF THE INVENTION

1. Field

The present invention relates generally to speed responsive couplings and more particularly to centrifugally engaging friction clutches having limited torque transmitting capability. It has been found desirable to provide a lock-up clutch between the impeller and turbine of a fluid torque converter capable of connecting the impeller and turbine together under selected operating conditions and capable of releasing the impeller and turbine for relative rotation under other operating conditions. It has been found desirable to provide a friction clutch which is capable of engagement at low rotational speeds, but capable of slipping at higher speed with increase in torque above the design level.

2. Prior Art

In the prior art it has been proposed to provide a centrifugally actuated friction shoe in combination with a resiliently deflectable wedging ramp wherein the engaging force of the shoe with a drive surface, and therefore the torque capacity of the clutch, is determined by a combination of the mass of the shoes, the speed of rotation, the angle of the wedging ramp, the coefficients of friction, and the resiliency of the wedging ramp. In order to achieve rotational balance of a rotatable assembly, it is desirable to provide a plurality of friction shoe assemblies spaced circumferentially about the rotatable member. It has been found that variations in the dimensional tolerance of ramp angles result in unequal distribution of torque capacity among the several shoes.

It is thought that further improvements in speed resposive friction clutches is desirable.

SUMMARY OF THE INVENTION

The present invention is directed to improvements in speed responsive couplings particularly centrifugally actuated friction clutches capable of engagement at low speed and having limited torque capacity at higher speed. More particularly, the present invention contemplates the use of a primary shoe, which may be light in weight, and which is subjected to centrifugal engaging forces throughout the operating speed range of the device, in combination with an auxiliary member, which may be heavy, and which is centrifugally operative for contributing to the engaging force of the shoe in a selected low speed range of the device and which is prevented from contributing further increases of engaging force with increasing speed of the device above a selected speed. Where a plurality of shoes are employed, the masses of the several shoes become the principal determining factor in the sharing of torque capacity at speeds of rotation above the selected speed. The coupling of the present invention is advantageously employed for connecting the impeller and turbine of a fluid torque converter together at low speeds of rotation while permitting slip to occur under certain higher speed operating conditions. When used with a fluid torque converter in a motor vehicle, the coupling of the present invention promotes low speed fuel economy while permitting higher speed shifts and further reduces torsional vibration when the vehicle is coasting due to the use of a one way clutch.

BRIEF DESCRIPTION OF THE DRAWINGS

FIG. 5 is an end view of the friction shoe assembly viewed along the line 5—5 of FIG. 3 in the direction of the arrows;

DESCRIPTION OF THE PREFERRED EMBODIMENT

Figure 1:
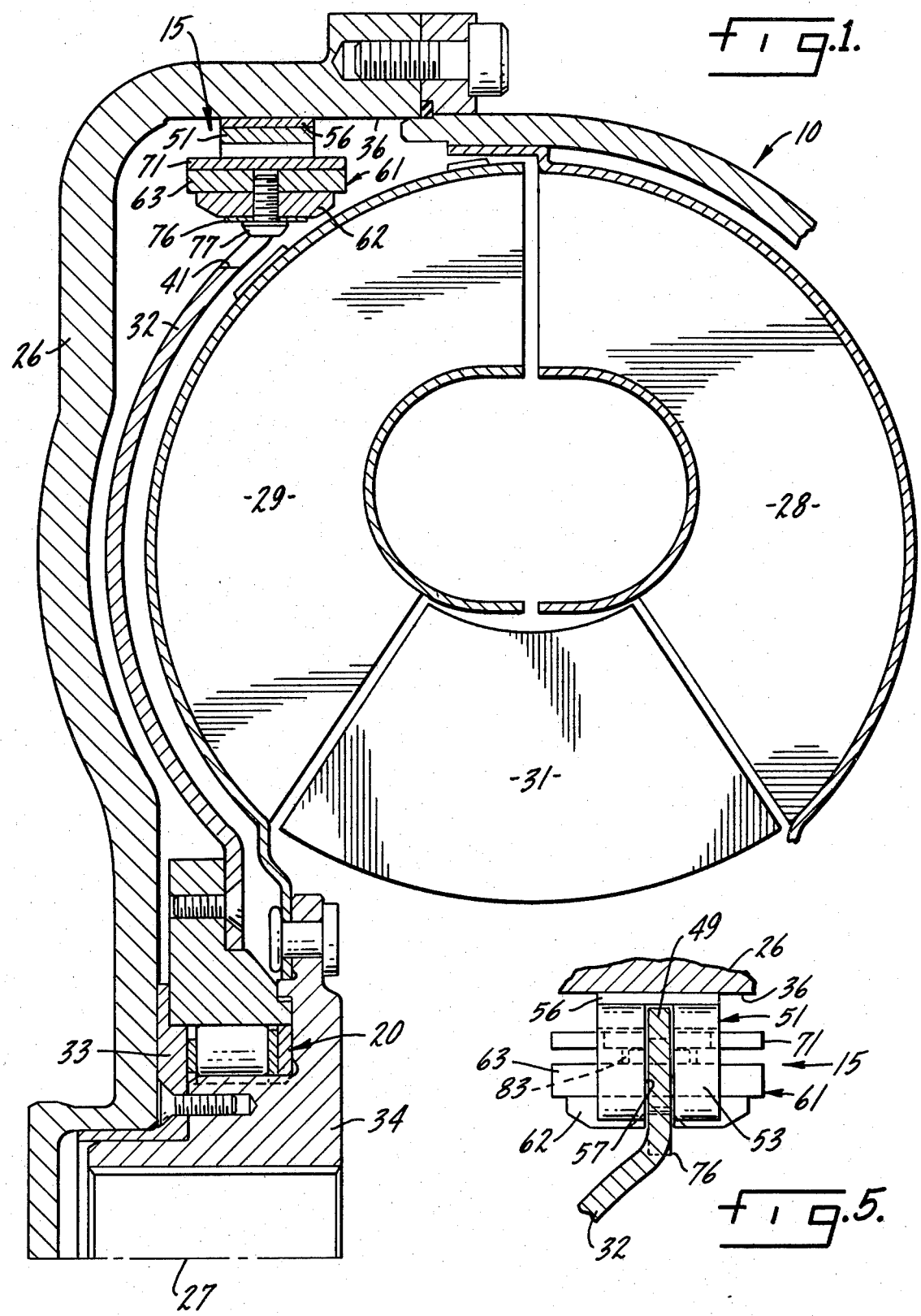
FIG. 1 is a fragmentary section view taken through a portion of a torque converter showing a speed responsive coupling according to the present invention connected thereto.

Referring now in more detail to the drawings, a portion of a fluid torque converter 10 is shown in FIG. 1 equipped with a speed responsive lock-up coupling 15, and provided with an overrunning clutch 20.

A first rotatable member 26 represented by a torque converter housing is mounted for rotation about an axis of rotation 27. The rotatable housing member 26 is connected to an impeller section 28 of a fluid torque converter having a turbine section 29 and a stator section 31 disposed adjacent to each other.

A second rotatable member 32 is disposed between a wall of first rotatable member 26 and turbine 29 and is mounted on a bearing member 33 for rotation about axis 27 coaxially with the first rotatable member 26.

A third rotatable member 34 is mounted for rotation about axis 27 coaxially with the first and second rotatable members 26 and 32. The overrunning clutch 20 is connected between second rotatable member 32 and third rotatable member 34 permitting third rotatable member 34 to turn faster than second rotatable member 32.

First rotatable member 26 is normally connected to a source of power such as the engine of a motor vehicle while third rotatable member 34 is normally connected to powered apparatus such as the drive line of a motor vehicle. Second rotatable member 32 is enclosed in the oil filled converter housing and is caused to rotate by means of the oil in the housing. When operating in a torque multiplication or slip mode, the third rotatable member 34 rotates slower than the first rotatable imput member 26.

First rotatable member 26 includes a circumferentially extending drive surface 36 which is engageable by the speed responsive drive coupling 15 providing a frictional coupling between first rotatable member 26 and second rotatable member 32.

Figure 2:
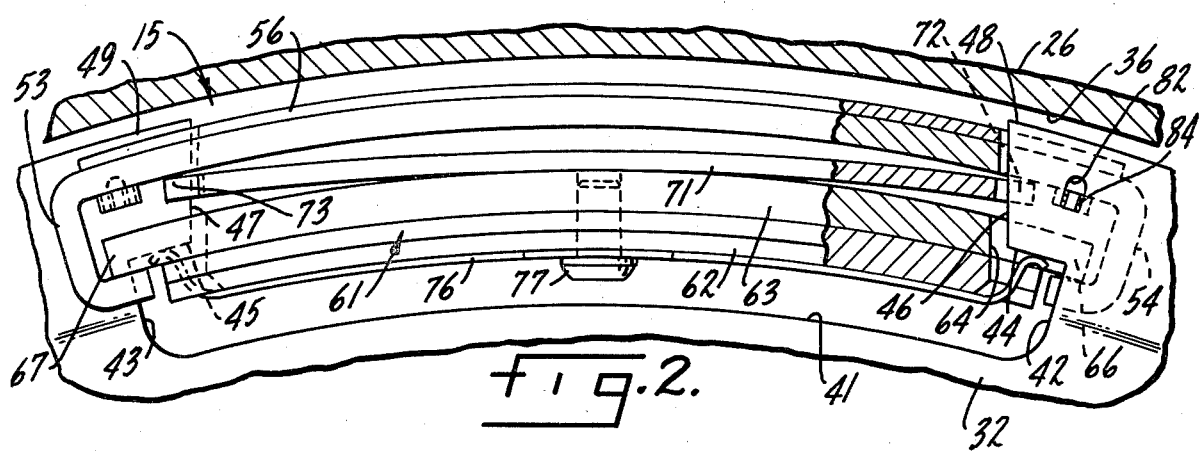
FIG. 2 is an elevation view of a friction shoe assembly shown in retracted position.
Figure 3:
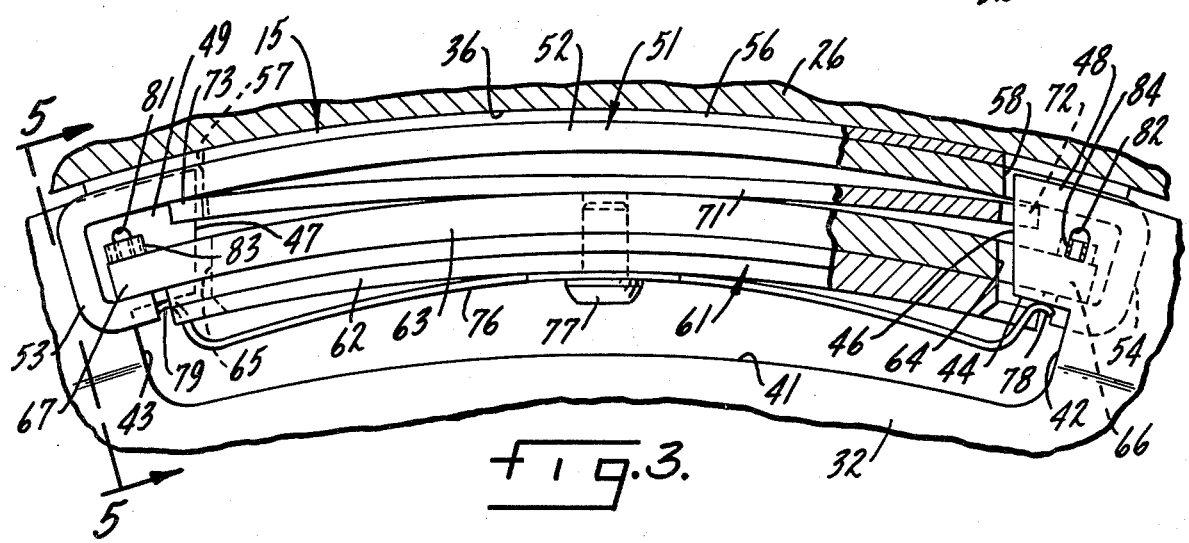
FIG. 3 is a view comparable with FIG. 2, showing the friction shoe assembly in an engaged low speed operating position.
Figure 4:
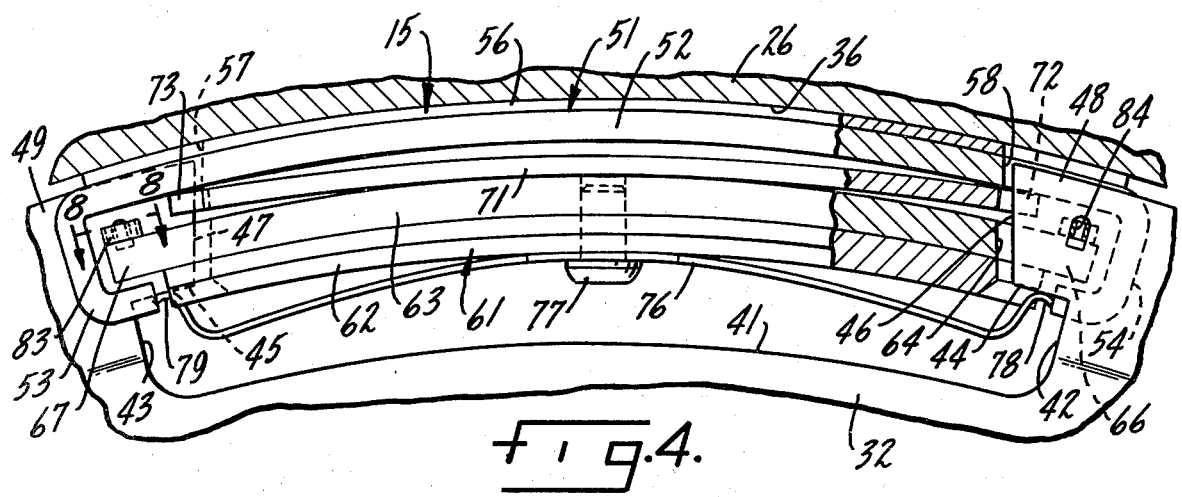
FIG. 4 is a view comparable with FIG. 2, showing the friction shoe assembly in an engaged high speed operating position.
Figure 8:
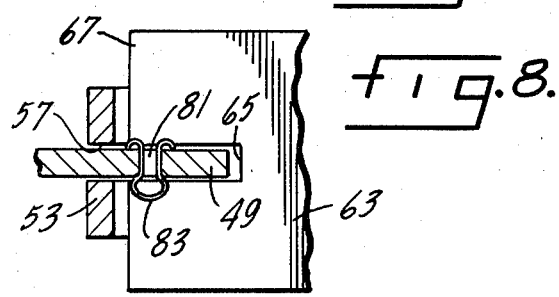
FIG. 8 is a fragmentary section view taken along the line 8—8 of FIG. 4.

Second rotatable member 32 is provided with a circumferential series of openings or notches each containing a friction shoe assembly, one of the openings and shoe assemblies being shown in more detail in FIGS. 2-4.

An opening or notch in rotatable member 32 is defined by the edge surfaces 41, 42, 43, 44, 45, 46, and 47. The edge surfaces 44, 46 define a guide projection 48 while edge surfaces 45, 47 define a circumferentially spaced guide projection 49, the guide projections 48, 49 serving to guide the radial movement of the lock-up coupling 15.

A centrifugally actuatable friction shoe 51 is formed of a bowed portion 52 and a pair of spaced channel end portions 53, 54. A friction facing material 56 is secured to bowed portion 52. Each of end portions 53, 54 is slotted as at 57, 58 for embracing a respective one of the guide projections 48, 49.

An auxiliary loading means is provided including a bowed follower member 61 formed of two relatively heavy pieces 62, 63 slotted at 64, 65 for embracing guide projections 48, 49. Opposite end portions 66, 67 of piece 63 of follower 61 are received within respective channel portions 53, 54 of friction shoe 51.

A yieldable load limiting leaf spring 71 is disposed between friction shoe 51 and follower member 61 having its mid portion bearing against follower member 61 and its end portions 72, 73 bearing against friction shoe 51.

A retractor spring 76 has a mid portion secured to follower member 61 by means of a screw 77 and spaced end portions 78, 79 engaging edge surfaces 44, 45 of the opening in second rotatable member 32.

Second rotatable member 32 includes a pair of spaced radially extending slots 81, 82 adjacent guide projections 48, 49. A pair of pins 83, 84 are loosely mounted in the slots 81, 82 forming stop means limiting outward movement of follower member 61 and inward movement of shoe 51.

Figure 7:
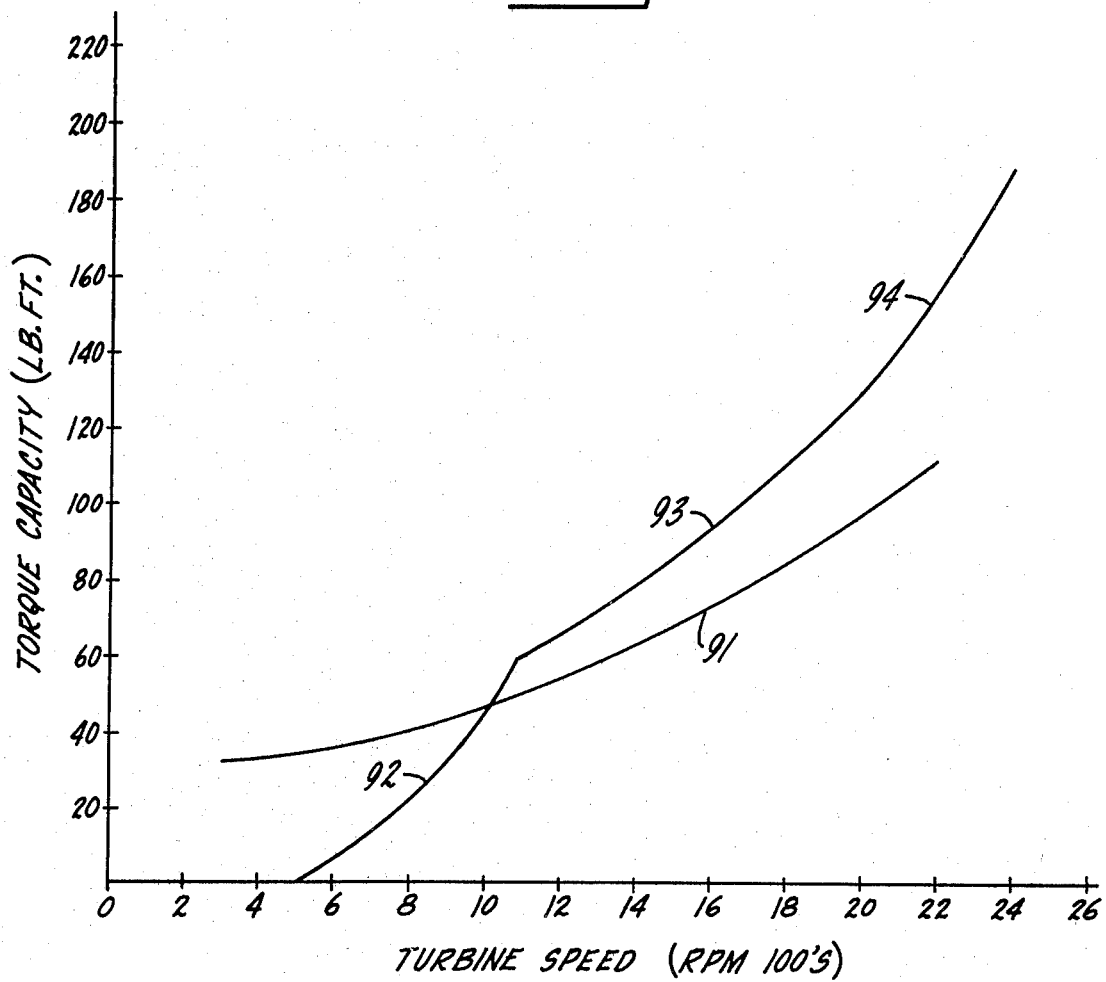
FIG. 7 is a chart showing torque capacity of the speed responsive coupling according to the present invention.
Figure 6:
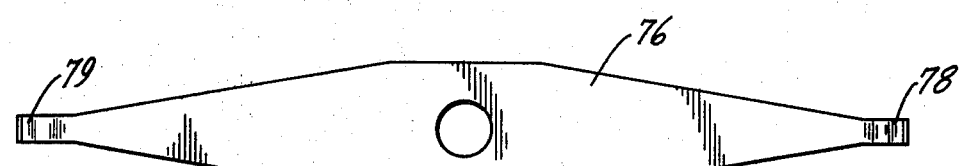
FIG. 6 is a view of the retractor spring for the friction shoe assembly.

Referring now to FIG. 7, the curve 91 represents the torque absorbed by third rotatable member 34 plotted as a function of speed of rotation and may be viewed as equivalent to a road-load torque curve of a motor vehicle when operating in drive ratio. The curve portions 92, 93, 94 represent the torque transmitting capacity of the friction shoe 51 in contact with drive surface 36 plotted as a function of speed of rotation.

Referring now to FIGS. 2-5 as well as FIG. 7, the shoe 51, load spring 71 and follower 61 remain in the retracted position as shown in FIG. 2 below 500 rpm in a typical design. At approximately 500 rpm, centrifugal force is high enough that the retractor spring 76 yields to permit the shoe 51, load spring 71 and follower 61 to move outwardly until shoe 51 engages drive surface 36 as shown in FIG. 3. Between approximately 500 rpm and 1100 rmp, the follower continues to move radially outwardly from the position shown in FIG. 3 to the position shown in FIG. 4. During transition from the positions of FIG. 3 to the positions of FIG. 4, the mass of shoe 51, spring 71 and follower 61 act in concert with increasing speed of rotation to increase engaging pressure between shoe 51 and surface 36 resulting in a torque capacity represented by curve portion 92. Follower 61 moves outwardly relative to shoe 61, flexing spring 71 which transmits the centrifugal force of follower 61 to shoe 51.

Upon reaching a speed of approximately 1100 rpm, follower 61 has moved pins 83, 84 to the outer limits of slots 81, 82 such that further outward movement of follower 61 is prohibited. The spring 71 thus remains flexed at a position equivalent to a speed of 1100 rpm until a speed of approximately 2000 rpm is reached. Between speeds of 1100 and 2000 rpm the engaging force between the shoe 51 and surface 36 is determined by the mass of shoe 51 acting centrifugally in response to the speed of rotation augmented by the flexure of spring 71. The corresponding torque capability is represented by curve portion 93.

At speeds above approximately 2000 rpm, the centrifugal force on spring 71 causes it to bow outwardly out of contact with follower 61. Above approximately 2000 rpm, the engaging force between shoe 51 and surface 36 is determined by the mass of shoe 51 and the mass of spring 71 acting centrifugally with further increase in speed of rotation. The torque transmitting characteristics above approximately 2000 rpm is represented by curve portions 94.

What is claimed is:

1. A speed responsive rotary coupling including a first rotatable member having a circumferentially extending drive surface defined therein, a second rotatable member, said second rotatable member including guide means, and a centrifugally actuated friction shoe movably mounted in said guide means for radial movement toward and from engagement with said drive surface, wherein the improvement comprises auxiliary loading means operatively connected to said friction shoe, said auxiliary loading means including a follower member movably mounted on said second rotatable member, said follower member being movable in a radially outward direction under the influence of centrifugal force responsive to rotation of said second rotatable member, a yieldable load spring engaged between said friction shoe and said follower member, said load spring being subjected to flexure in accordance with radially outward movement of said follower member, whereby said load spring imposes a force on said shoe proportional to flexure of said spring by said follower member, and further including stop means operative to limit outward movement of said follower member whereby after initial shoe contact with said drive surface, the engaging force of said shoe will have a first relationship to rotational speed of said second rotatable member, and after the follower member contacts the stop means, a second relationship between the shoe engaging force and rotational speed of said second rotatable member is developed.

2. A speed responsive rotary coupling according to claim 1, wherein said second rotary member includes a pair of spaced pins engageable with said follower member defining said stop means limiting radial outward movement of said follower.

3. A speed responsive rotary coupling according to claim 1, including a third rotatable member and including an overrunning clutch connected between said second rotatable member and said third rotatable member permitting said third rotatable member to overrun said second rotatable member.

4. A speed responsive rotary coupling according to claim 3, wherein said first rotatable member is connected to the impeller element of a fluid torque converter, and said third rotatable member is connected to the turbine element of said fluid torque converter, said second rotatable member providing a speed responsive frictional connection between said first and third rotatable members, said auxiliary loading means limiting the torque transmittable through said drive surface and friction shoe above a selected speed of rotation of said second rotatable member.

5. A speed responsive rotary coupling according to claim 2, including a retractor spring between said second rotatable member and said follower member, said spring having a mid portion secured to said follower member and opposite ends engaging said guide means.

6. A speed responsive rotary coupling including a first rotatable member having a circumferentially extending drive surface defined therein, a second rotatable member, said second rotatable member including guide means, and a centrifugally actuated friction shoe movably mounted in said guide means for movement toward and from engagement with said drive surface, wherein the improvement comprises auxiliary loading means operatively connected to said friction shoe, said auxiliary loading means including a follower member movably mounted on said second rotatable member, said follower member being movable in a radially outward direction under the influence of centrifugal force responsive to rotation of said second rotatable member, a yieldable load spring engaged between said friction shoe and said follower member, said friction shoe including a pair of spaced channel portions, said follower member having end portions received in said channel portions, said load spring being a leaf spring having a mid portion engaging said follower member and end portions engaging said friction shoe and being subjected to flexure in accordance with radially outward movement of said follower member, whereby said load spring imposes a force on said shoe proportional to flexure of said spring by said follower member, and further including stop means operative to limit outward movement of said follower member.

7. A rotary coupling including a first rotatable member having a circumferentially extending surface defined therein, a second rotatable member, said second rotatable member including guide means, and a friction shoe assembly slidably mounted in said guide means for radial movement toward and from engagement with said surface, said shoe assembly including a friction shoe and loading means operatively connected to said friction shoe, said loading means being movable radially outwardly under the influence of centrifugal force responsive to rotation of said second rotatable member, a load spring engaged between said friction shoe and said loading means, said load spring being subjected to flexure in accordance with radially outward movement of said loading means whereby said load spring imposes a force on said shoe proportional to the force imposed thereon by said loading means, and further including stop means operative to limit outward radial movement of said loading means, whereby after initial shoe contact with said surface, the engaging force of said shoe will have a first relationship to rotational speed of said second rotatable member, and after the loading means contacts the stop means, a second relationship between the shoe engaging force and rotational speed of said second rotatable member is developed.

8. A coupling as defined in claim 7, wherein said guide means comprises a notch formed in said second rotatable member.

9. A coupling is defined in claim 8, wherein said shoe assembly includes means defining slots receiving said second rotatable means whereby said slots guide said shoe assembly for slidable radial movement in said guide means.

* * * * *